United States Patent
Mansell et al.

(10) Patent No.: US 8,418,175 B2
(45) Date of Patent: Apr. 9, 2013

(54) DATA PROCESSING APPARATUS AND METHOD FOR CONTROLLING ACCESS TO SECURE MEMORY BY VIRTUAL MACHINES EXECUTING ON PROCESSING CIRCUIRTY

(75) Inventors: David Hennah Mansell, Cambridge (GB); Richard Roy Grisenthwaite, Guilden Morden (GB); Stuart David Biles, Little Thurlow (GB)

(73) Assignee: ARM Limited, Cambridge (GB)

( * ) Notice: Subject to any disclaimer, the term of this patent is extended or adjusted under 35 U.S.C. 154(b) by 1077 days.

(21) Appl. No.: 12/379,082

(22) Filed: Feb. 12, 2009

(65) Prior Publication Data

US 2009/0222816 A1    Sep. 3, 2009

(30) Foreign Application Priority Data

Feb. 29, 2008 (GB) ................... 0803830.9

(51) Int. Cl.
*G06F 9/00* (2006.01)
(52) U.S. Cl.
USPC ............................................................. 718/1
(58) Field of Classification Search ........................ None
See application file for complete search history.

(56) References Cited

U.S. PATENT DOCUMENTS

| | | | |
|---|---|---|---|
| 5,522,075 A | 5/1996 | Robinson et al. | |
| 7,120,771 B2* | 10/2006 | Dahan et al. | 711/163 |
| 7,171,539 B2 | 1/2007 | Mansell et al. | |
| 7,305,534 B2 | 12/2007 | Watt et al. | |
| 2003/0079103 A1 | 4/2003 | Morrow | |
| 2004/0177269 A1* | 9/2004 | Belnet et al. | 713/200 |
| 2006/0020781 A1 | 1/2006 | Scarlata et al. | |
| 2006/0206687 A1* | 9/2006 | Vega | 711/206 |
| 2006/0271760 A1* | 11/2006 | Nicolai | 711/207 |
| 2007/0061535 A1 | 3/2007 | Xu et al. | |

FOREIGN PATENT DOCUMENTS

| | | |
|---|---|---|
| GB | 2 396 930 | 7/2004 |
| JP | 2002 157133 | 5/2002 |
| JP | 2002 182560 | 6/2002 |

(Continued)

OTHER PUBLICATIONS

Search Report for GB 0803830.9 dated Jun. 6, 2008.

(Continued)

*Primary Examiner* — Robert Fennema
(74) *Attorney, Agent, or Firm* — Nixon & Vanderhye P.C.

(57) ABSTRACT

Processing circuitry executes hypervisor software to support the execution of multiple virtual machines on the processing circuitry. A memory system stores data for access by the processing circuitry and includes secure memory and non-secure memory. The secure memory is only accessible via a secure access request. Address translation circuitry is responsive to an access request issued by a current virtual machine specifying a virtual address, to perform an address translation process to identify a physical address in the memory, and to cause a modified access request to be issued to the memory system specifying the physical address. The hypervisor software sets a trusted virtual machine identifier if the current virtual machine is to be trusted to access the secure memory. The address translation circuitry can only cause the modified access request to be issued as a secure access request to the secure memory if the trusted identifier is set.

12 Claims, 9 Drawing Sheets

FOREIGN PATENT DOCUMENTS

| | | |
|---|---|---|
| JP | 2004 171567 | 6/2004 |
| JP | 2006 506751 | 2/2006 |
| JP | 2006 120089 | 5/2006 |
| JP | 2008 500651 | 1/2008 |
| JP | 2009 508259 | 2/2009 |
| WO | WO 2004/046924 A1 | 6/2004 |

OTHER PUBLICATIONS

United Kingdom Peer to Patent Pilot Review Report, Oct. 5, 2011.
English Translation of Japanese Office Action mailed Dec. 4, 2012 in Japanese Application No. 2009-045231.

* cited by examiner

IF TRUSTED VM BIT NOT SET BY HYPERVISOR

FIG. 5A

IF TRUSTED VM BIT IS SET BY HYPERVISOR

DATA PROCESSING APPARATUS AND METHOD FOR CONTROLLING ACCESS TO SECURE MEMORY BY VIRTUAL MACHINES EXECUTING ON PROCESSING CIRCUIRTY

TECHNICAL FIELD

The present invention relates to a data processing apparatus and method for controlling access to secure memory by virtual machines executing on processing circuitry of the data processing apparatus.

BACKGROUND

In a typical virtualisation environment, a processing device such as a processor core is arranged to execute hypervisor software which supports the execution of multiple virtual machines on that processing device. Each virtual machine will typically have one or more applications running on a particular operating system, with the hypervisor software acting as an interface layer between the virtual machine and the underlying hardware to enable the provision of appropriate hardware support to the virtual machine. Via the hypervisor software layer, each virtual machine gets a particular view of the system in which it resides, and thus gets a particular view of the available hardware resources of the system. Each virtual machine operates independently of other virtual machines on the system, and indeed is not necessarily aware of the presence of the other virtual machines.

Accordingly, in an example system, one virtual machine may be executed which runs a particular operating system, for example Microsoft Windows, whilst another virtual machine is executed running a different operating system, for example Linux.

Irrespective of whether virtualisation techniques are used or not, there arise many instances where the data associated with one application is sensitive data that should not be accessible by other applications running on devices of the data processing apparatus. It is clearly important in such situations to ensure that such sensitive data is kept secure so that it cannot be accessed by other applications that may be loaded onto the data processing apparatus, for example hacking applications that have been loaded onto the data processing apparatus with the purpose of seeking to access that sensitive data.

It has traditionally been the job of the operating system developer to ensure that the operating system provides sufficient security to ensure that the sensitive data of one application cannot be accessed by other applications running under the control of the operating system. However, as systems become more complex, the general trend is for operating systems to become larger and more complex, and in such situations it becomes increasingly difficult to ensure sufficient security within the operating system itself. To seek to alleviate the reliance on operating system security, it is known to provide a system in which a data processing apparatus is divided into two distinct domains or worlds, these domains providing a mechanism for handling security at the hardware level. Such a system is described for example in commonly assigned co-pending U.S. patent Application Ser. No. 10/714,561, now U.S. Pat. No. 7,305,534, the contents of which are herein incorporated by reference, this application describing a system having a secure domain and a non-secure domain. In that system, the non-secure and secure domains in effect establish separate worlds, the secure domain providing a trusted execution space separated by hardware enforced boundaries from other execution spaces, and likewise the non-secure domain providing a non-trusted execution space.

In such secure systems, the memory system is typically divided into secure memory and non-secure memory. Any applications operating in the non-secure domain are unable to access to secure memory. However, when in the secure domain, it is typically possible to access both the secure memory and the non-secure memory.

When seeking to incorporate such hardware-based security into a data processing apparatus employing the earlier-mentioned virtualisation techniques, the processing circuitry can be arranged whilst in the non-secure domain to execute multiple non-secure virtual machines, each of which can be given its own view of the non-secure memory address space. The processing circuitry can then enter the secure domain in order to execute the hypervisor software, and indeed can, if desired, execute one or more secure applications under the control of a secure operating system within the secure domain. The hypervisor maintains the separation of the multiple non-secure virtual machines by exercising control over the address translation mechanism used to generate physical addresses for accessing the memory system. Since this is managed from the secure domain, the non-secure virtual machines cannot modify that address translation mechanism.

To enable multiple secure virtual machines to also be provided, it would be necessary to implement a system where the hypervisor operated in an additional privilege level above that of the secure domain, thereby enabling the hypervisor to exercise the same level of control over the address translation mechanism for the various secure virtual machines as is used for the non-secure virtual machines. However, such an approach would require an additional level of privilege over and above those already provided to support the secure domain and non-secure domain, and this additional level of complexity will in many implementations be considered unacceptable.

However, without modifying the system in the above manner it is not possible to virtualise multiple secure operating systems, i.e. to run multiple virtual machines in the secure domain. In particular, since in the secure domain there will be no level of privilege distinction between the hypervisor software and any other software executing in the secure domain, if multiple secure virtual machines were to be established, it would be possible for one secure virtual machine to modify the address translation mechanism put in place by the hypervisor software, and by that process gain access to the secure data of one of the other virtual machines.

Accordingly, in a system where an additional level of privilege is not provided for the hypervisor, any virtual machine must be arranged to execute in the non-secure domain, but as a result it will be unable to access secure memory.

Accordingly, it would be desirable to provide a mechanism which allowed multiple virtual machines to be executed which could access secure memory under conditions controlled by the hypervisor software without the requirement for an additional level of privilege to be provided for the hypervisor software.

SUMMARY

Viewed from a first aspect, the present invention provides a data processing apparatus, comprising: processing circuitry for executing hypervisor software to support the execution of multiple virtual machines on the processing circuitry; a memory system for storing data for access by the processing circuitry, the memory system comprising secure memory for storing secure data and non-secure memory for storing non-secure data, the secure memory only being accessible via a secure access request; address translation circuitry, responsive to an access request issued by a current virtual machine executing on the processing circuitry and specifying a virtual address, to perform an address translation process to identify a physical address in said memory containing data seeking to be accessed by the current virtual machine, and to cause to be issued to the memory system a modified access request specifying the physical address; and a storage for storing a trusted virtual machine identifier managed by the hypervisor software, the hypervisor software being arranged to set the trusted virtual machine identifier if the current virtual machine is to be trusted to access the secure memory; in response to the access request issued by the current virtual machine, the address translation circuitry only being able to cause the modified access request to be issued as said secure access request specifying a physical address within the secure memory if the trusted virtual machine identifier is set.

In accordance with the present invention, a storage is provided for storing a trusted virtual machine identifier that is managed by the hypervisor software, the hypervisor software setting the trusted virtual machine identifier dependent on the current virtual machine executing on the processing circuitry, so as to identify whether that current virtual machine is trusted or not. The address translation circuitry then makes reference to the trusted virtual machine identifier when performing the address translation process, and is only able to cause the access request as modified by the address translation process to specify a physical address within the secure memory if the trusted virtual machine identifier is set.

Accordingly, the invention allows the hypervisor software to support multiple virtual machines at least some of which have access to secure memory. The invention hence allows multiple trusted virtual machines to co-exist on the same processing circuitry.

The hypervisor software will typically be arranged to exercise control over the address translation process performed by the address translation circuitry, and accordingly is able to restrict each such trusted virtual machine to a subset of the secure memory space, thereby ensuring the separation of the multiple trusted virtual machines.

Hence, considering the earlier example of a system having a secure domain and a non-secure domain, all of the virtual machines can be executed in the non-secure domain, but through use of the trusted virtual machine identifier managed by the hypervisor software executing in the secure domain, certain of those virtual machines can be recognised as trusted virtual machines that are allowed to issue access requests that can be mapped into the secure memory address space by the address translation circuitry.

The address translation circuitry can be arranged in a variety of ways. However, in one embodiment the address translation circuitry is arranged to perform the address translation by performing a virtual address to intermediate address translation dependent on a first stage page table, and an intermediate address to physical address translation dependent on a second stage page table, at least the second stage page table being managed by the hypervisor software. By ensuring that the hypervisor software manages the second stage page table, then the hypervisor software can ensure the separation of the various virtual machines executing on the processing circuitry. In one embodiment, a second stage page table may be provided for each virtual machine. Similarly, the first stage page tables can be specified on a virtual machine-by-virtual machine basis, and indeed in some embodiments separate first stage page tables will be provided for different applications running within a particular virtual machine.

The first stage page tables can be managed in a variety of ways, but in one embodiment the first stage page table is managed by the current virtual machine. Accordingly, a currently executing virtual machine can control its own first stage page table(s), and hence can manage how virtual addresses are mapped to intermediate addresses, but the hypervisor software then manages the intermediate address to physical address translation dependent on a second page table, thereby ensuring that each virtual machine is given its own view of physical memory.

There are a number of ways in which the address translation process can be arranged to take account of the trusted virtual machine identifier. In one embodiment, the data processing apparatus further comprises page table identifier storage for identifying the first stage page table and the second stage page table, and if the trusted virtual machine identifier is set, the page table identifier storage is arranged to identify a non-secure second stage page table and a secure second stage page table. When performing the address translation in response to the access request issued by the current virtual machine, the address translation circuitry uses the specified virtual address to access a descriptor in the first stage page table providing information required to produce a corresponding intermediate address, the descriptor further providing a first stage security value. If the trusted virtual machine identifier is set, the first stage security value is used to determine whether the non-secure second stage page table or the secure second stage page table is used when performing the intermediate address to physical address translation. In one embodiment, the non-secure second stage page table will only allow intermediate addresses to be mapped to physical addresses within the non-secure memory, whilst the secure second stage page table will additionally allow intermediate addresses to be mapped to physical addresses in secure memory under certain conditions.

In such embodiments, if the trusted virtual machine identifier is set to identify the current virtual machine as a trusted virtual machine, then a first stage security value obtained from the relevant descriptor in the first stage page table is used to determine whether the non-secure second stage page table or the secure second stage page table is used when performing the intermediate address to physical address translation. Thus, the current virtual machine through its management of the first stage page table can identify whether it wants certain accesses to be treated as non-secure accesses or secure accesses. If the accesses are marked via the first stage security value as being non-secure, then the second stage of the address translation will occur using the non-secure second stage page table. However, if the access is marked as secure, and the trusted virtual machine identifier is set, then the secure second stage page table is used when performing the second stage of address translation.

It should be noted that the second stage page tables can be placed either in secure memory (since the hypervisor software has access to secure memory), or in non-secure memory. Since the hypervisor software manages the second stage of the address translation, even if these second stage page tables are placed in non-secure memory, the hypervisor can still ensure that they are not accessible by any of the virtual machines. However, it is inherently more secure to place the second stage page tables in secure memory, since in such cases even if there was an error made in a mapping entry that allowed access in principle to these tables from one or more virtual machines, such an access would still be prevented given the security state of the secure memory. Nevertheless secure memory is often a relatively limited resource, and hence in practice the choice of location for these page tables will be a trade off between improved security and space.

In one embodiment, if the trusted virtual machine identifier is not set, the non-secure second stage page table is used when performing the intermediate address to physical address translation, irrespective of the first stage security value, and the address translation circuitry causes the modified access request to be issued as a non-secure access request specifying a physical address within the non-secure memory. Hence, if the trusted virtual machine identifier is not set, then the first state security value is ignored, and accordingly this ensures that a non-trusted virtual machine is not provided with any mechanism to access secure memory.

In one embodiment, if the secure second stage page table is used when performing the intermediate address to physical address translation, the address translation circuitry uses the produced intermediate address to access a descriptor in the secure second stage page table providing information required to produce a corresponding physical address, the descriptor further providing a second stage security value. The second stage security value is then used to determine whether the address translation circuitry generates as the corresponding physical address a physical address within the secure memory or a physical address within the non-secure memory. Thus the address translation circuitry causes the modified access request to be issued as said secure access request specifying a physical address within the secure memory if the trusted virtual machine identifier is set, the first stage security value causes the secure second stage page table to be used when performing the intermediate address to physical address translation, and the second stage security value causes the address translation circuitry to generate as the corresponding physical address a physical address within the secure memory.

By this approach, only if the first stage security value and the second stage security value both indicate that the access is to secure memory, and the trusted virtual machine identifier is set by the hypervisor software, is the access actually allowed to take place with respect to secure memory. If either the first stage security value or the second stage security value mark the access as non-secure, the access will instead get mapped to an address in the non-secure physical address space.

Whilst in the embodiments described above, a non-secure second stage page table and a secure second stage page table are used, in alternative embodiments there is no requirement for the two separate second stage page tables. Indeed, in one embodiment; when performing the address translation in response to the access request issued by the current virtual machine, the address translation circuitry uses the specified virtual address to access a descriptor in the first stage page table providing information required to produce a corresponding intermediate address, the descriptor further providing a first stage security value, and the address translation circuitry further uses the produced intermediate address to access a descriptor in the second stage page table providing information required to produce a corresponding physical address, the descriptor further providing a second stage security value. If the trusted virtual machine identifier is set, the address translation circuitry causes the modified access request to be issued as said secure access request specifying a physical address within the secure memory if both the first stage security value and the second stage security value identify the access as secure.

In accordance with this embodiment, the first stage security value is not used to choose between different second stage page tables, but instead is used in combination with a second stage security value read from the second stage page table to determine whether an access should proceed to secure memory or not. In particular, only if both the first stage security value and the second stage security value identify the access as secure, and the trusted virtual machine identifier is set by the hypervisor software, does the address translation circuitry output a secure access request specifying a physical address within the secure memory.

In one embodiment, if the trusted virtual machine identifier is set, the address translation circuitry causes the modified access request to be issued as a non-secure access request specifying a physical address within the non-secure memory if both the first stage security value and the second stage security value identify the access as non-secure.

Further, in one embodiment, if the trusted virtual machine identifier is set, the address translation circuitry causes the access request to be aborted if the first stage security value and the second stage security value differ.

In an alternative embodiment, the address translation circuitry can be arranged to cause the access request to be directed to non-secure memory if the first stage security value marks the access as secure but the second stage security value marks the access as non-secure. In this alternative embodiment, an assumption is made that the second stage mappings are more likely to be correct than the first stage mappings, i.e. the second stage mappings describe the type of accesses that the hardware is expecting and that the hypervisor has allowed.

In one embodiment, if the trusted virtual machine identifier is not set, the address translation circuitry causes the modified access request to be issued as a non-secure access request specifying a physical address within the non-secure memory irrespective of the first stage security value and the second stage security value. By such an approach, it can be seen that the hypervisor software maintains ultimate control over whether any virtual machine is able to access secure memory.

In one embodiment, the processing circuitry executes in a secure domain when executing the hypervisor software, the secure memory being accessible from the secure domain, and the processing circuitry executes in a non-secure domain when executing any of the multiple virtual machines, by default the secure memory not being accessible from the non-secure domain, except if the trusted virtual machine identifier is set by the hypervisor software for the current virtual machine, in which event the address translation circuitry is able to cause the modified access request to be issued as said secure access request specifying a physical address within the secure memory.

If in such embodiments an access request is issued by the processing circuitry when executing in the secure domain, the address translation circuitry is arranged to perform, based on the specified virtual address, a virtual address to physical address translation dependent on a secure page table managed by the hypervisor software. Hence, in such embodiments, access requests issued in the secure domain can be managed by a single stage address translation from virtual to physical address dependent on a secure page table. However, any virtual machines will be retained in the non-secure domain, and access requests issued by such virtual machines will be subjected to the two stage address translation process as discussed earlier.

Viewed from a second aspect, the present invention provides a method of controlling access to secure memory by virtual machines executing on processing circuitry, the processing circuitry executing hypervisor software to support the execution of multiple virtual machines on the processing circuitry, and a memory system being provided for storing data for access by the processing circuitry, the memory system comprising said secure memory for storing secure data and non-secure memory for storing non-secure data, the secure memory only being accessible via a secure access request, the method comprising the steps of: storing in a storage accessible to the processing circuitry a trusted virtual machine identifier managed by the hypervisor software, the hypervisor software setting the trusted virtual machine identifier if a current virtual machine is to be trusted to access the secure memory; responsive to an access request issued by the current virtual machine executing on the processing circuitry and specifying a virtual address, performing an address translation process to identify a physical address in said memory containing data seeking to be accessed by the current virtual machine; and issuing to the memory system a modified access request specifying the physical address, the modified access request only being able to be issued as said secure access request specifying a physical address within the secure memory if the trusted virtual machine identifier is set.

Viewed from a third aspect, the present invention provides a data processing apparatus, comprising: processing means for executing hypervisor software to support the execution of multiple virtual machines on the processing means; memory means for storing data for access by the processing means, the memory means comprising secure memory means for storing secure data and non-secure memory means for storing non-secure data, the secure memory means only being accessible via a secure access request; address translation means, responsive to an access request issued by a current virtual machine executing on the processing means and specifying a virtual address, for perform an address translation process to identify a physical address in said memory means containing data seeking to be accessed by the current virtual machine, and for causing to be issued to the memory means a modified access request specifying the physical address; and a storage means for storing a trusted virtual machine identifier managed by the hypervisor software, the hypervisor software being arranged to set the trusted virtual machine identifier if the current virtual machine is to be trusted to access the secure memory means; in response to the access request issued by the current virtual machine, the address translation means only being able to cause the modified access request to be issued as said secure access request specifying a physical address within the secure memory means if the trusted virtual machine identifier is set.

DESCRIPTION OF EXAMPLE EMBODIMENTS

Figure 1:
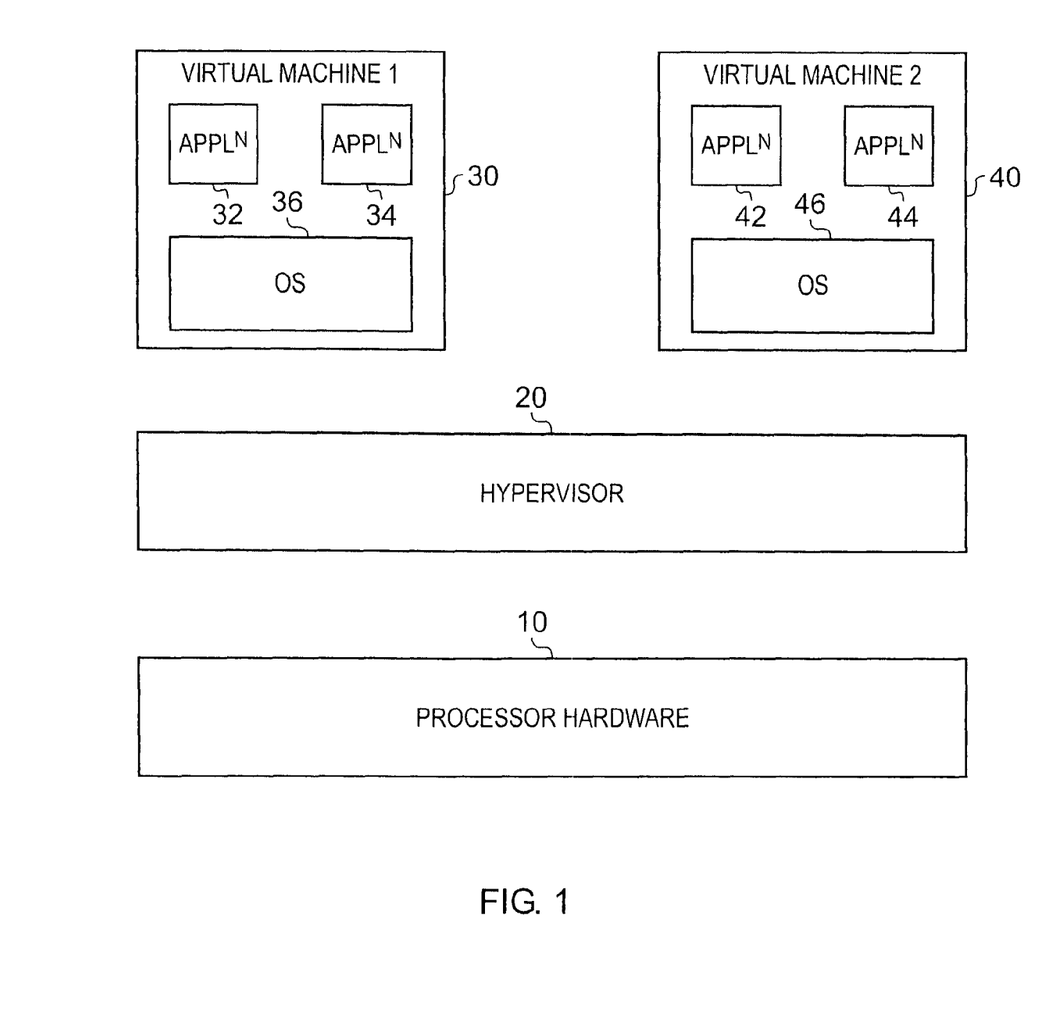
FIG. 1 is a diagram schematically illustrating a virtualisation environment in which embodiments of the present invention may be employed.

FIG. 1 is a diagram schematically illustrating a virtualisation environment in which embodiments of the present invention may be employed. The processor hardware 10, such as a processor core, is arranged to execute hypervisor software 20 in order to support the execution of multiple virtual machines 30, 40 on the processor hardware. Although in FIG. 1 only two virtual machines 30, 40 are shown, it will be appreciated that more than two virtual machines may be provided for execution on the same processor hardware 10.

Each virtual machine 30, 40 has one or more applications 32, 34, 42, 44 running on a particular operating system 36, 46. Via the hypervisor software 20, each virtual machine 30, 40 is provided with a particular view of the system in which it resides, and hence for example gets a particular view of the available hardware resources of the system. Each of the virtual machines 30, 40 typically operates independently of any of the other virtual machines executing on the processor hardware 10, and indeed is not necessarily aware of the presence of the other virtual machines.

In accordance with one embodiment of the present invention, the data processing apparatus on which the processor hardware 10 resides has a plurality of domains in which the devices of the data processing apparatus (including the processor hardware 10) can operate. In one particular embodiment, the plurality of domains comprises a secure domain and a non-secure domain, and predetermined access rights are associated with each domain. In particular, when operating in the non-secure domain, a device can only access non-secure data associated with that non-secure domain. Hence, when operating in the non-secure domain, it is not possible to access secure data pertaining to the secure domain. The predetermined access rights associated with the secure domain can take a variety forms, but typically will allow a device operating in the secure domain to access both the secure data of the secure domain and the non-secure data of the non-secure domain.

The memory system of the data processing apparatus will provide secure memory for storing the secure data and non-secure memory for storing the non-secure data, with the secure memory only being accessible via a secure access request. The secure memory and non-secure memory need not be provided as physically separate memory devices, but instead each memory device within the memory system can be arranged to contain one or more secure regions for storing secure data and one or more non-secure regions for storing non-secure data, and accordingly the entire physical memory address space of the memory system can be partitioned to provide a number of secure memory regions and a number of non-secure memory regions.

Figure 2:
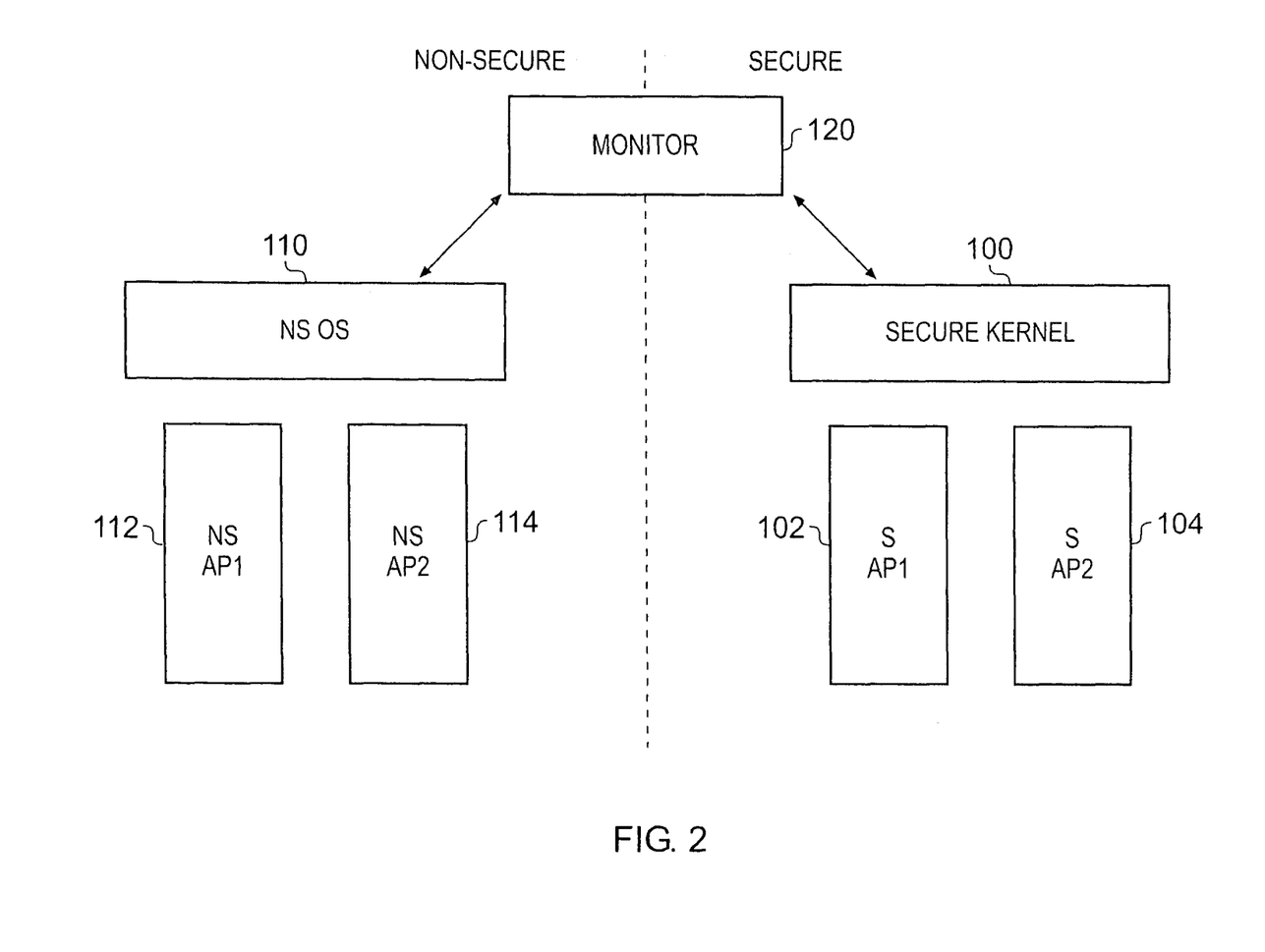
FIG. 2 schematically illustrates different programs operating in a non-secure domain and a secure domain.

Within a system that supports such a secure domain and a non-secure domain, each device that can operate in either the secure domain or the non-secure domain is typically arranged to execute monitor code in order to transition from one domain to another. Considering the example of a processor core arranged in such a way, the operation of such a processor core is described in detail in the earlier-mentioned co-pending U.S. patent application Ser. No. 10/714,561. FIG. 2 is provided to indicate an overview of the operation of such a processor core, and the reader is referred to the above-mentioned US patent application for further details.

FIG. 2 schematically illustrates various programs running on a processing system having a secure domain and a non-secure domain. The system is provided with a monitor program 120 which executes at least partially in a monitor mode. The monitor program 120 is responsible for managing all changes between the secure domain and the non-secure domain, in either direction. From a view external to the processor core the monitor mode is always secure and the monitor program is in secure memory.

Within the non-secure domain, there is provided a non-secure operating system 110 and a plurality of non-secure application programs 112, 114 which execute in cooperation with the non-secure operating system 110. In the secure domain, a secure kernel program 100 is provided and the secure kernel program 100 can be considered to form a secure operating system. Typically, such a secure kernel program 100 will be designed to provide only those functions which are essential to processing activities which must be provided in the secure domain, such that the secure kernel 100 can be as small and simple as possible since this will tend to make it more secure. A plurality of secure applications 103, 104 are illustrated as executing in combination with the secure kernel 100.

FIG. 2 illustrates the transition from the secure domain to the non-secure domain within a processor core, but does not consider the situation where the processor core may itself operate in a virtualisation environment such as shown in FIG. 1, where multiple virtual machines may co-exist. Such virtualisation techniques can be readily employed in the non-secure domain, such that multiple non-secure virtual machines can be executed, each of which can be given its own view of the non-secure memory address space. The processor core can then use the monitor program 120 to enter the secure domain in order to execute the hypervisor software, and indeed can, if desired, additionally execute the one or more secure applications 102, 104 under the control of the secure operating system 100 within the secure domain.

However, using the arrangement of FIG. 2, it is not possible to virtualise multiple secure operating systems, i.e. to run multiple virtual machines in the secure domain. This is due to the fact that in the secure domain there is no level of privilege distinction between the hypervisor software and any other software executing in the secure domain. Accordingly, if multiple secure virtual machines were to be established, it would be possible for one secure virtual machine to modify any address translation mechanism put in place by the hypervisor software, and by that process gain access to the secure data of one of the other virtual machines.

Accordingly, in embodiments of the present invention, when using a virtualisation environment to provide multiple virtual machines executing on the processor hardware 10, all of the virtual machines are arranged to execute in the non-secure domain. However, by using techniques of embodiments of the present invention, certain of those virtual machines can be allowed to access secure memory under the control of the hypervisor software, as will be discussed in more detail with reference to the remaining figures.

Figure 3:
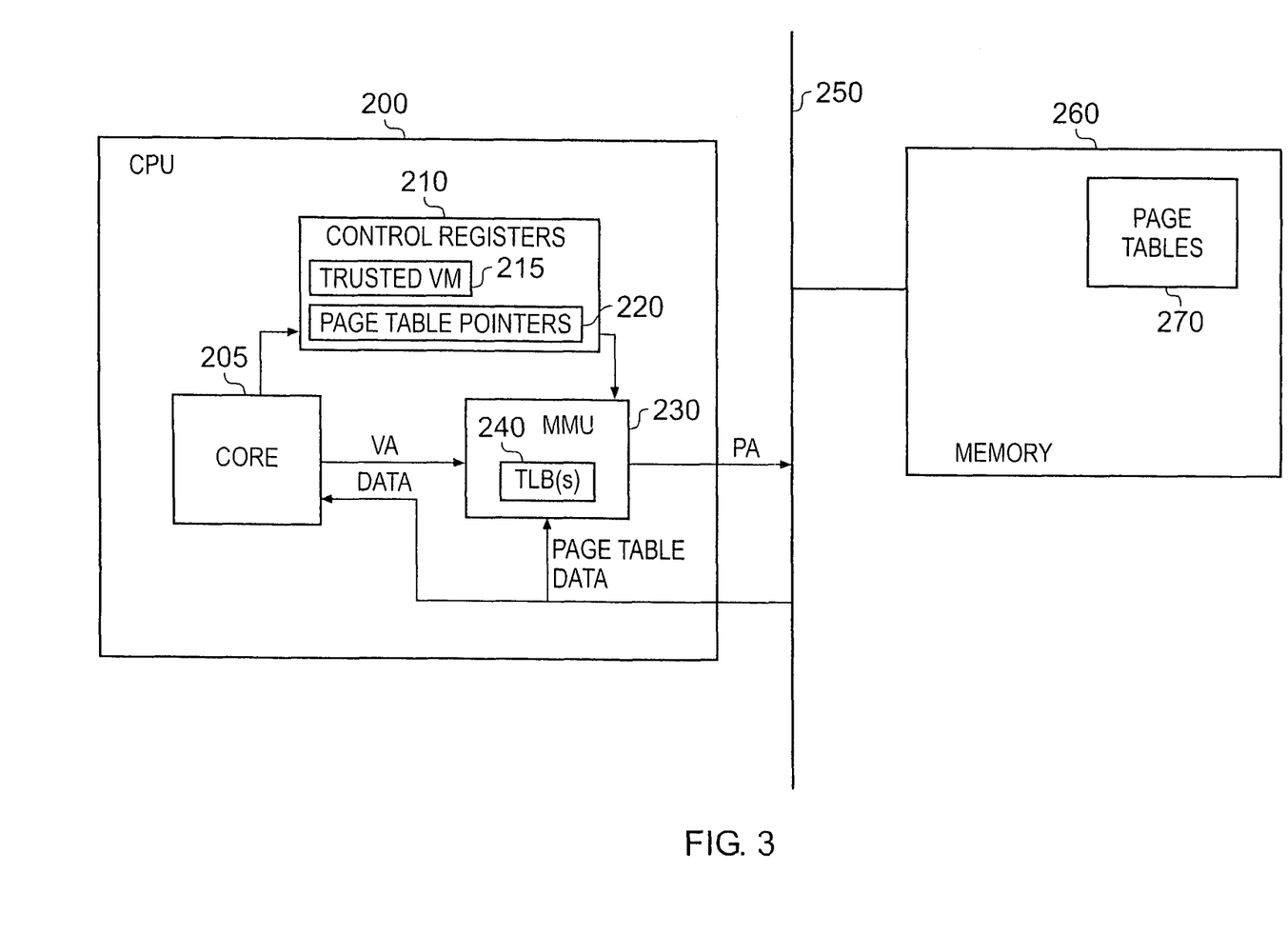
FIG. 3 is a block diagram of a data processing apparatus in accordance with one embodiment of the present invention.

FIG. 3 is a block diagram of a data processing apparatus in accordance with one embodiment of the present invention. A central processing unit (CPU) 200 includes a processor core 205 that can execute hypervisor software to support the execution of multiple virtual machines on the processor core 205.

The processor core 205 is coupled to a system bus 250 via the memory management unit (MMU) 230 which is arranged to manage access requests issued by the processor core 205 for access to locations within the memory system 260 of the data processing apparatus. Accordingly, any access request issued by the core 205 and specifying a virtual address will be passed to the MMU 230, with the MMU being responsible for performing predetermined access control functions, more particularly for determining the physical address corresponding to that virtual address, and for resolving access permission rights and determining region attributes. To enable the MMU 230 to perform these functions, the MMU can access one or more page tables 270 provided within the memory system 260.

Figure 4:
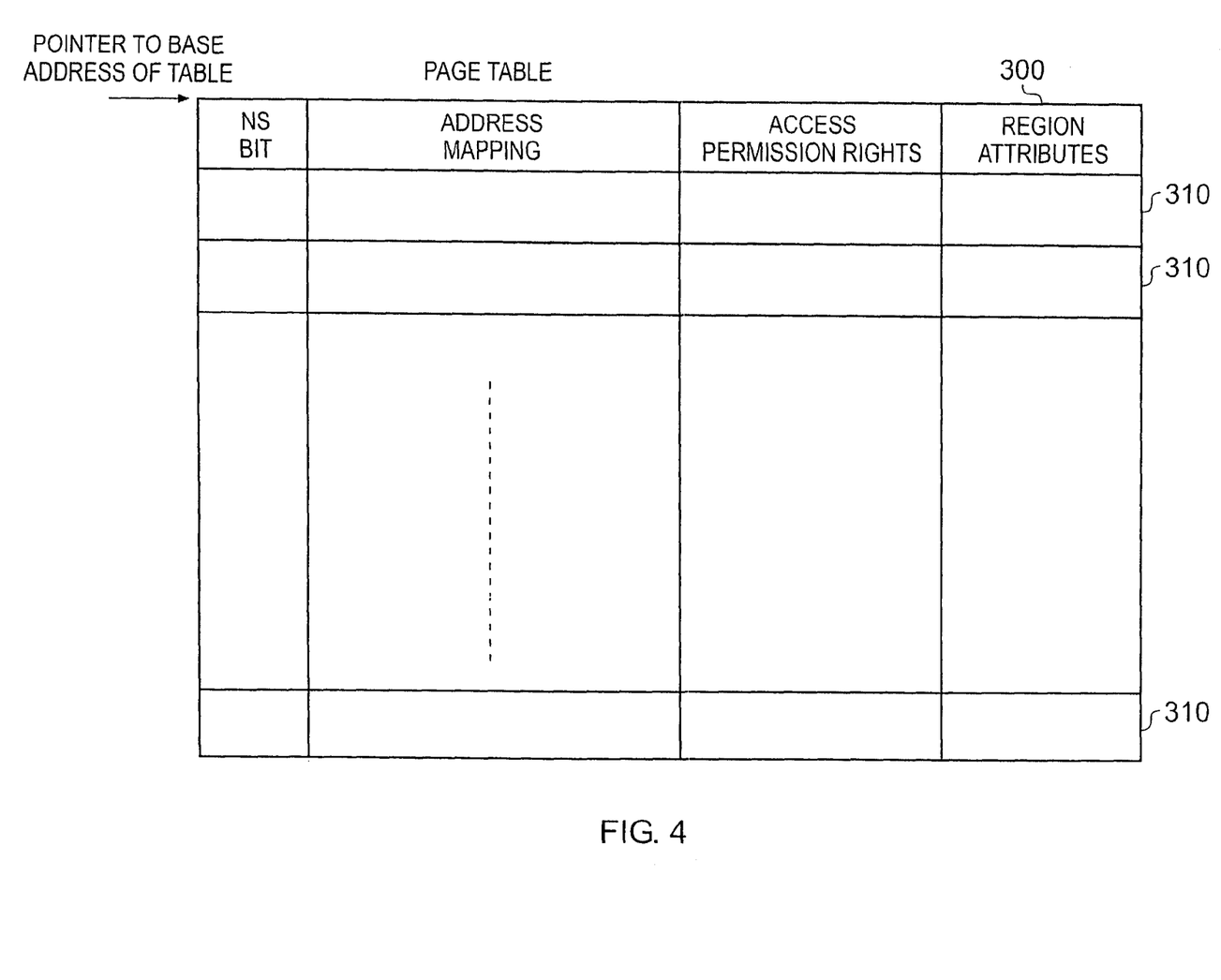
FIG. 4 schematically illustrates a page table used in embodiments of the present invention.

An example of a page table is illustrated schematically in FIG. 4. As shown in FIG. 4, page table 300 contains a plurality of descriptors, each descriptor providing, for a particular region of memory, address mapping information, access permission rights, region attributes, and any other required information, for example the size of the memory region to which the descriptor relates. The access permission rights will specify whether the associated memory region is read only, write only, read/write, or no access, whilst the region attributes will identify whether an access to that region is cachable, bufferable, etc. The address mapping information will identify how to convert an incoming address to form an output address.

In one embodiment of the present invention, the address translation performed by the MMU 230 with reference to the page tables 270 is a two stage process, in which a virtual address is first translated to an intermediate address dependent on the address mapping provided within the relevant descriptor of a first stage page table, and is then translated from the intermediate address to a physical address dependent on an address mapping provided within the relevant descriptor of a second stage page table.

As also shown in FIG. 4, each descriptor 310 within page table 300 can be provided with a security value, also referred to herein as a non-secure (NS) bit value. The NS bit value obtained from the relevant descriptor in the first stage page table is referred to herein as a first stage NS bit value and the NS bit value obtained from the relevant descriptor of the second stage page table is referred to herein as a second stage NS bit value. As will be discussed in more detail later, these NS bit values are used by the MMU 230 when deciding how to map a virtual address to a physical address within the memory system 260.

Returning to FIG. 3, it can be seen that the MMU 230 contains one or more table lookaside buffers (TLBs) 240 in which information retrieved from the page tables 270 by the MMU 230 can be stored locally to improve the MMU performance when processing access requests. As will also be appreciated by those skilled in the art, a micro-TLB can also be provided for caching a subset of the information stored in the TLBs 240, this further improving the performance of the MMU 230.

The operation of the components within the CPU 200 is controlled by a number of control registers 210. For the purposes of describing embodiments of the present invention, certain control registers are of particular interest. Firstly, one or more of the control registers will specify page table pointers 220 which are used by the MMU 230 when determining which page tables 270 within the memory 260 should be referenced when handling access requests issued by the processor core 205. Given that in embodiments of the present invention both a first stage page table and a second stage page table are referenced by the MMU when handling the virtual address to physical address translation process, the page table pointers 220 will include a page table pointer to a first stage page table and a separate page table pointer to a second stage page table. The actual page table pointers will depend upon the virtual machine currently being executed by the processor core 205.

In one embodiment, the first stage page tables can be managed by each virtual machine, and indeed any particular virtual machine can establish separate first stage page tables for the different applications running on that virtual machine. Hence, the first stage page table pointer provided within the control registers 210 will be set by the processor core 205 dependent on the virtual machine currently running, and potentially dependent on the particular application running within that virtual machine.

In contrast, the second stage page table is managed by the hypervisor software 20. The hypervisor software may provide a separate second stage page table for each virtual machine, and hence again the actual second stage page table pointer provided within the control register 210 will be set by the hypervisor software running on the processor core 205, dependent on the currently executing virtual machine.

In addition to the page table pointers 220, the hypervisor software executing on the processor core 205 is also able to set a trusted virtual machine (VM) bit 215 within the control registers 210, if the trusted VM bit is set, this indicating that the currently executing virtual machine is trusted to access secure memory. As will be discussed in more detail later, only if the trusted VM bit is set by the hypervisor software, will the MMU 230 use the NS bit values from the first stage page table and the second stage page table in order to determine whether to produce a physical address within secure memory or a physical address within non-secure memory in response to a particular access request issued by the processor core 205. If the trusted VM bit is not set, then the NS bit value information will be ignored, and any access request issued by the current virtual machine will be mapped to a physical address within non-secure memory.

Accordingly, when the MMU 230 receives an access request, it determines with reference to the one or more TLB structures 240 whether that TLB currently stores the descriptor information from the first stage and second stage page tables for the memory region containing the virtual address specified by the access request. If not, then the page table pointer information 220 within the control registers 210 is used by the MMU 230 to access the relevant first and/or second stage page tables 270 within the memory 260 in order to retrieve the required descriptors, so that those descriptors can be stored within the TLB 240 and used by the MMU 230 to process the access request.

There are a number of ways in which the MMU 230 can be arranged to store the descriptors from the first stage and second stage page tables within one or more TLB structures 240. For example, in one embodiment, the MMU 230 can be considered to comprise two separate MMUs, each with its own TLB, the first MMU performing the virtual to intermediate address translation, and the second MMU performing the intermediate to physical address translation. Alternatively, a single consolidated MMU and associated TLB structure may be provided for performing the required two stage address translation process. More details of ways in which the MMU can be arranged is discussed in commonly assigned U.S. Pat. No. 7,171,539, the entire contents of which are hereby incorporated by reference.

Figure 5A:
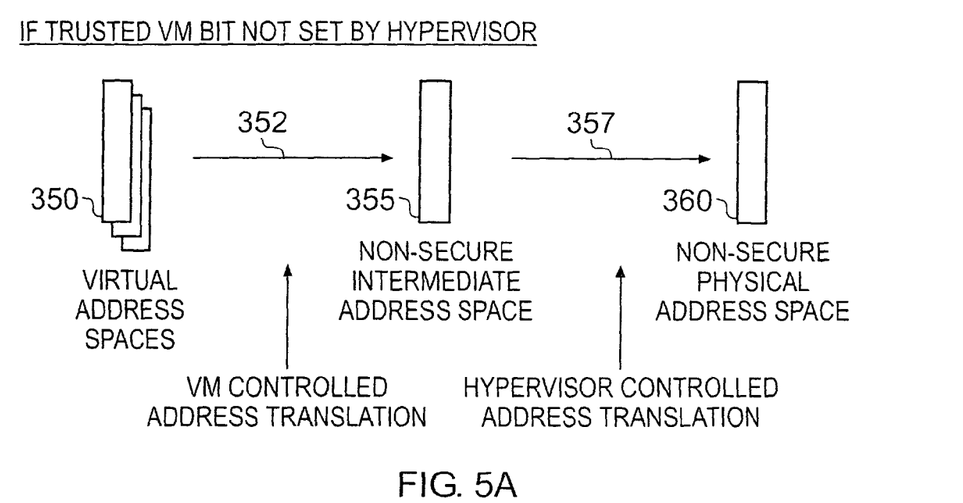
FIGS. 5A to 5C schematically illustrate the address translation process employed in accordance with a first embodiment of the present invention.

FIG. 5A schematically illustrates the address translation performed by the MMU 230 for an access request issued by a virtual machine executing on the processor core 205 in the non-secure domain, in a situation where the trusted VM bit 215 is not set. As shown in FIG. 5A, one or more virtual address spaces 350 may be used by the applications executing on the virtual machine, and for example separate virtual address spaces may be associated with each application executed by that virtual machine. For each such virtual address space, the virtual machine may establish a separate first stage page table. With reference to the relevant first stage page table, the MMU 230 is able to perform an address translation 352 from the virtual address space 350 to the non-secure intermediate address space 355, this address translation being in effect controlled by the virtual machine through the virtual machine's management of the first stage page tables.

Thereafter, the MMU 230 references a second stage page table controlled by the hypervisor in order to perform an intermediate address to physical address translation 357. Since the trusted VM bit is not set, any NS bit values specified in either the first stage page table or the second stage page table are ignored, and instead the second stage address translation 357 will always produce a physical address within the non-secure physical address space 360. Since the second stage page table is managed by the hypervisor, it is not possible for the virtual machine to alter the second stage of address translation, and accordingly it can be assured that only non-secure physical addresses can be issued in response to such access requests.

Figure 5B:
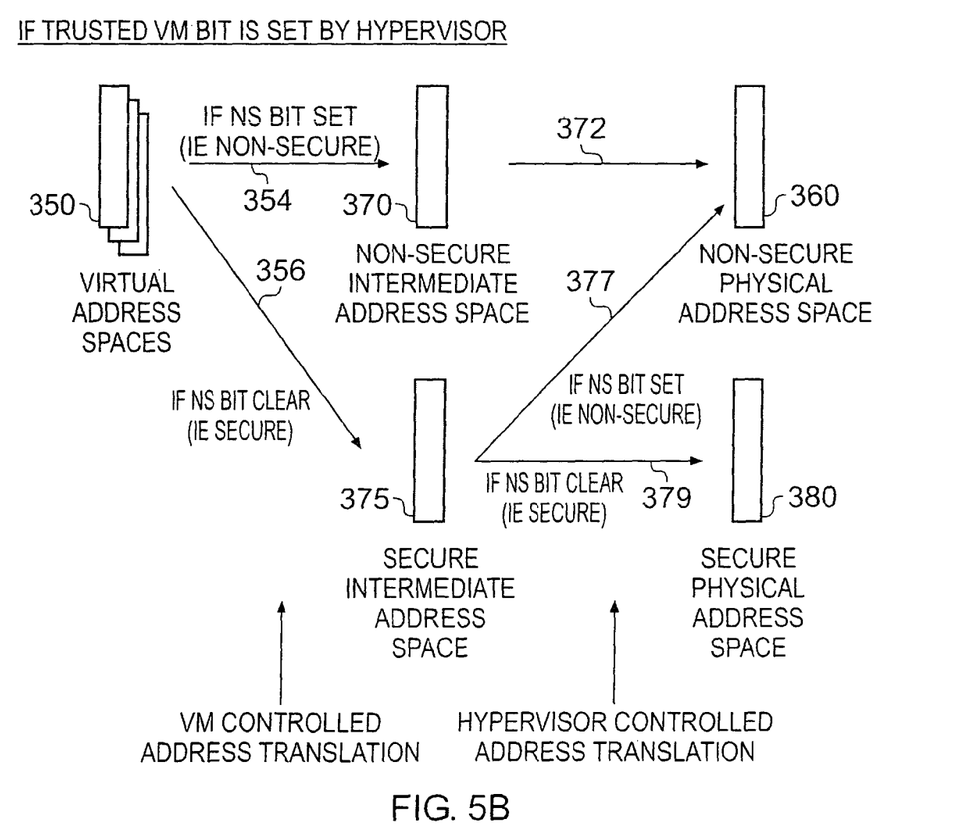

FIG. 5B illustrates how the address translation is performed by the MMU 230 if the trusted VM bit is set. As shown in FIG. 5B, the MMU again references the relevant first stage page table, but the mapping to the intermediate address space is dependent on the value of the NS bit in the relevant descriptor of the first stage page table. If the NS bit is set, to indicate that the virtual machine considers the access request to be a non-secure access request, then when the intermediate address within non-secure intermediate address space 370 is produced by the address translation 354, a non-secure second stage page table is then referenced to provide the mapping 372 from the non-secure intermediate address space 370 to the non-secure physical address space 360. This second stage of address translation then proceeds in the same manner as discussed with reference to FIG. 5A.

However, if the NS bit in the relevant descriptor of the first stage page table is clear, indicating that the virtual machine considers the access request to be a secure access request, then when the intermediate address within secure intermediate address space 375 is produced by the address translation 356, a secure second stage page table is then referenced for the second stage of the address translation process, this secure second stage page table providing mappings 377, 379 from the secure intermediate address space 375 to the physical address space 360, 380. As shown in FIG. 5B, it is possible for this second stage of address translation to produce a physical address in either the secure physical address space 380 or the non-secure physical address space 360, this being dependent on the NS bit value in the relevant descriptor of the second stage page table. In particular, if the NS bit is set in the second stage page table descriptor, indicating that the hypervisor considers the access to be a non-secure access, then a physical address within the non-secure physical address space 360 will be produced by the MMU 230. However, if the NS bit is clear, indicating that the hypervisor considers the access to be secure, then a physical address within the secure physical address space 380 will be produced by the MMU 230.

In one embodiment, the non-secure second stage page table used when the trusted VM bit is set is the same page table as the second stage page table used when the trusted VM bit is not set. This hence allows a trusted virtual machine to access a non-secure virtual machine's memory space in an analogous manner to that in which software running in the secure domain of FIG. 2 can access the data of non-secure applications running in the non-secure domain, thereby reducing the changes that might otherwise be needed to enable secure software designed for operating in a secure domain to operate correctly in a trusted virtual machine (which as discussed earlier will actually run in the non-secure domain).

Figure 5C:
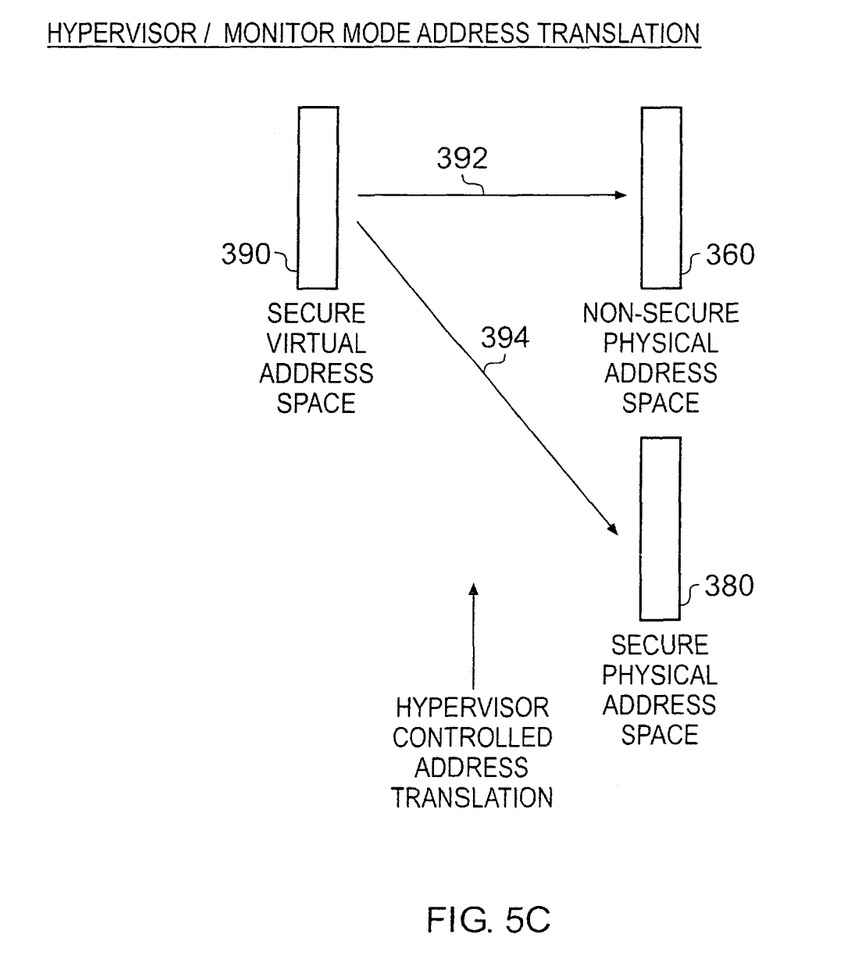

FIG. 5C provides an illustration of how address translation is managed by the MMU 230 for any access requests issued by the processor core 205 when executing in the secure domain, as for example may be the case for any access requests issued by the hypervisor software, or from any other software running in the secure domain. In this case, a secure page table is used to provide a direct mapping 392, 394 of the virtual address in the secure virtual address space 390 to a physical address which may be either in the non-secure physical address space 360 or the secure physical address space 380, dependent on an NS bit value stored in the relevant descriptor of the secure page table. The secure page table will typically be managed by the hypervisor, and accordingly this translation can be considered to be controlled by the hypervisor software. It will be appreciated that this mechanism is hence an entirely standard address translation mechanism that would be provided, for example, for secure applications running in the secure domain of a processing device such as that shown in FIG. 2, e.g. a system where no virtualisation is present.

Figure 6:
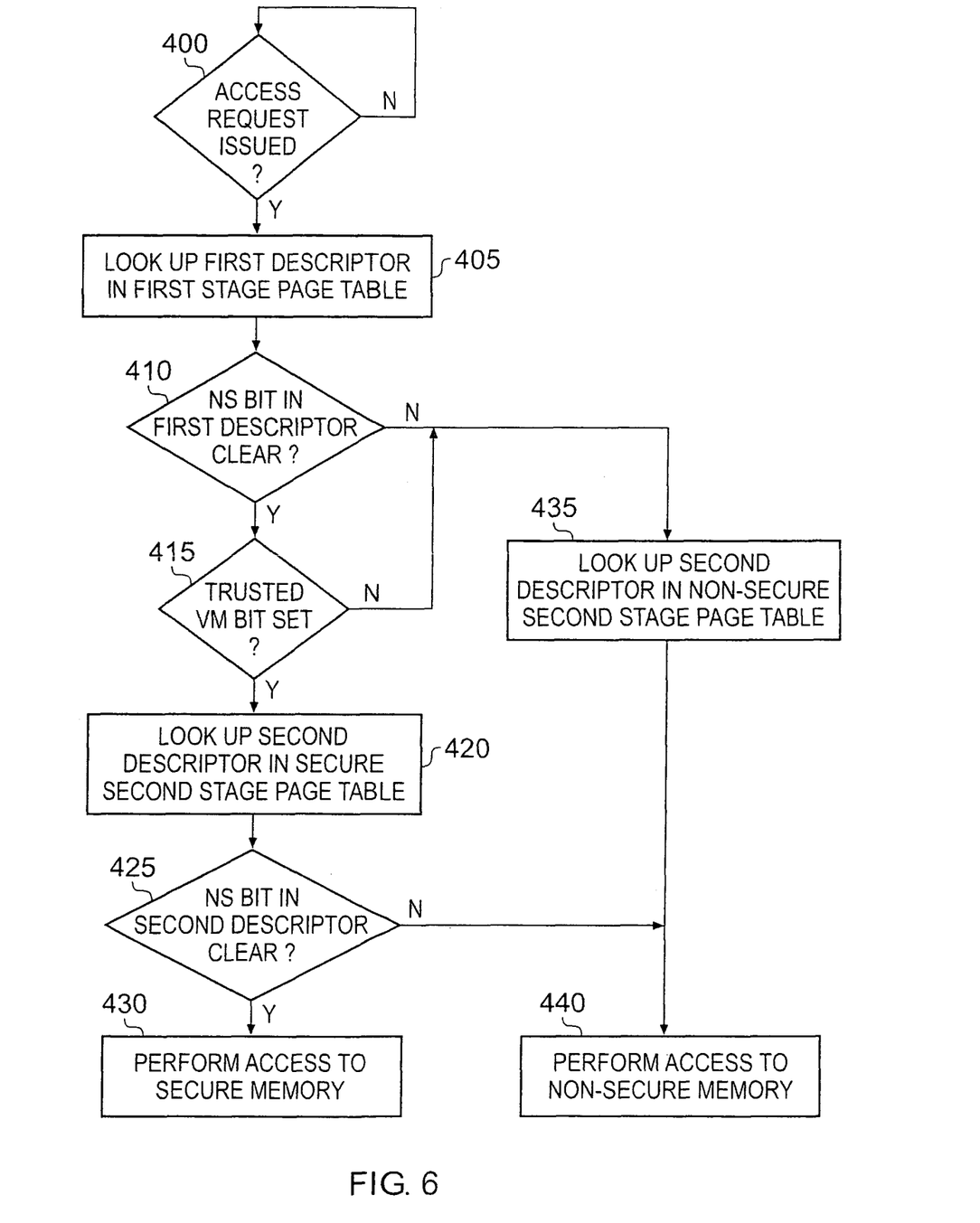
FIG. 6 is a flow diagram illustrating the address translation process in accordance with the first embodiment of the present invention.

FIG. 6 is a flow diagram illustrating the address translation process performed in accordance with the first embodiment of the present invention as discussed earlier with reference to FIGS. 5A and 5B. At step 400, an access request is awaited by the MMU 230, and on receipt of the access request, the MMU performs at step 405 a lookup procedure in order to obtain the access information stored in the relevant descriptor of the first stage page table (this relevant descriptor being referred to as the first descriptor herein). Clearly if this information is already cached within the TLB 240 there will be no need to actually perform the lookup in the first stage page table, and instead the information can be obtained directly from the TLB.

At step 410, it is then determined whether the NS bit in the first descriptor is clear, and if it is it is then determined at step 415 whether the trusted VM bit 215 is set for the current virtual machine. Only if both the NS bit in the first descriptor is clear and the trusted VM bit is set, does the processor then proceed to step 420, where a further lookup is performed in the relevant descriptor of the secure second stage page table (referred to herein as the second descriptor). Again, if this information is already cached within the TLB 240 there will be no need to actually perform the lookup in the second stage page table. Thereafter, it is determined whether the NS bit in the second descriptor is clear, and if it is, then the MMU 230 produces a physical address enabling an access to be performed to secure memory at step 430.

If the NS bit in the first descriptor was not clear, or the trusted VM bit was not set, then steps 410/415 will branch to step 435, where the second stage of the address translation is performed with respect to a non-secure second stage page table, and the relevant descriptor in that non-secure second stage page table is then reviewed to obtain the necessary access information. Again, if this information is already cached within the TLB 240 there will be no need to actually perform the lookup in the second stage page table. Thereafter an address in the non-secure address space is produced to enable an access to non-secure memory to be performed at step 440.

Similarly, if at step 425 it is determined that the NS bit in the second descriptor is not clear, then again a physical address in the non-secure memory will be produced and the process will proceed to step 440 where an access to non-secure memory will be performed.

Figure 7A:
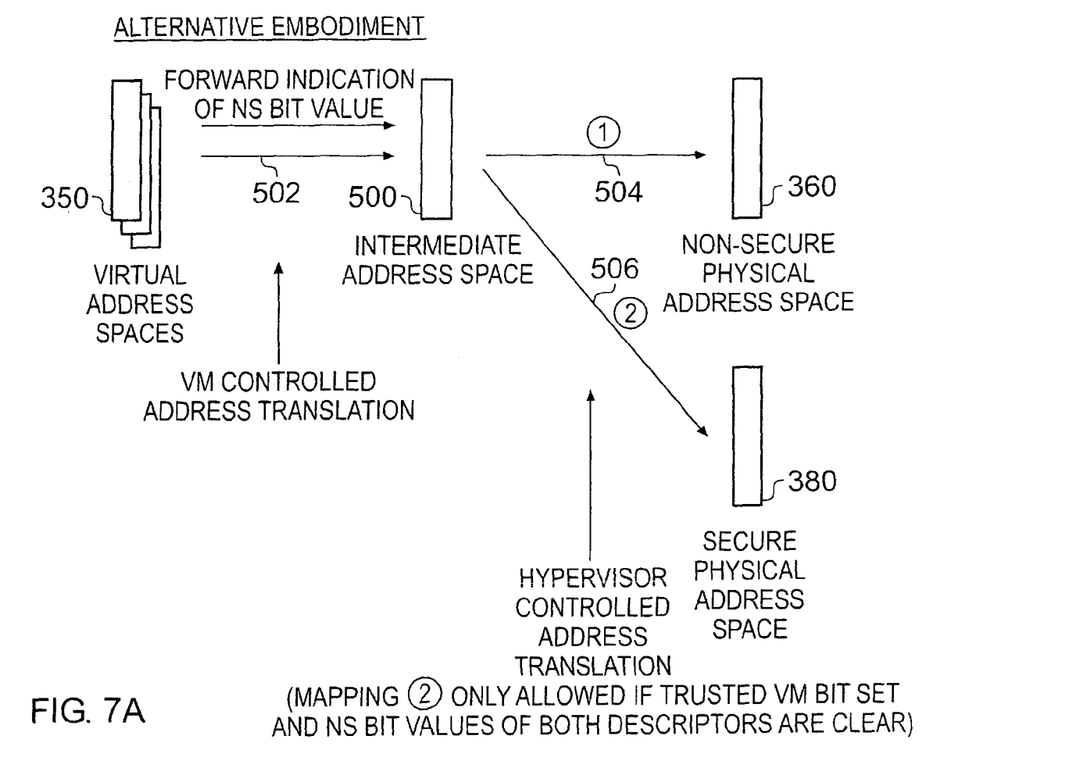
FIG. 7A schematically illustrates an address translation process in accordance with an alternative embodiment of the present invention.

FIG. 7A illustrates an alternative embodiment where separate non-secure and secure second stage page tables are not provided, and instead a single second stage page table is used. As shown in FIG. 7A, the first stage of address translation again involves making reference to the first stage page table for the relevant virtual address space 350 in order to perform the virtual to intermediate address translation 502, and in this embodiment the NS bit value from the relevant descriptor of the first stage page table is forwarded along with the intermediate address for use in the second stage of the address translation process. The second stage of the address translation process involves referencing a second stage page table for the intermediate address space 500 to identify the required intermediate to physical address translation 504, 506. In particular, dependent on the NS bit values in both the first stage page table and the second stage page table, and the setting of the trusted VM bit, the MMU 230 will determine whether to produce a physical address within the non-secure physical address space 360 or a physical address within the secure physical address space 380. In particular, only if the trusted VM bit is set and the NS bit values from both descriptors of the first stage page table and the second stage page table are clear (indicating secure access) will the MMU produce a physical address within the secure physical address space 380.

Figure 7B:
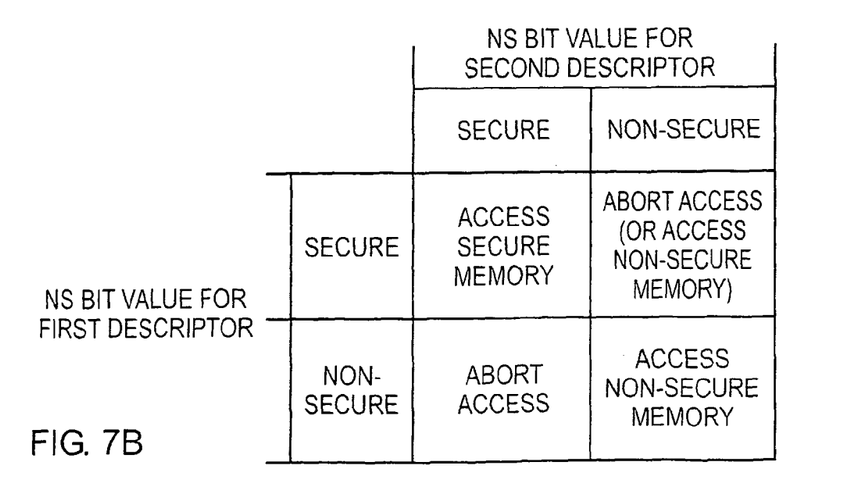
FIG. 7B is a table illustrating how access requests are handled in accordance with the second embodiment of the present invention, assuming the trusted virtual machine identifier is set.

FIG. 7B is a table illustrating how the MMU produces the physical address dependent on the NS bit values in the first descriptor and second descriptor, assuming the trusted VM bit is set. As can be seen, if both NS bit values identify the access as secure, then a physical address will be produced allowing access to secure memory. Similarly, if both NS bit values identify the access as non-secure, then a physical address will be produced identifying an address in the non-secure physical address space 360.

In one embodiment, if the NS bit value for the first descriptor does not match the NS bit value for the second descriptor, then the access is aborted. However, in one embodiment, if the NS bit value for the first descriptor marks the access as secure and the NS bit value for the second descriptor marks the access as non-secure, then the NS bit value associated with the second stage page table will be treated as the definitive one, and a physical address in the non-secure physical address space 360 will be produced. Hence, since the hypervisor software controls the second stage page table, if the hypervisor software indicates the access should be treated as non-secure, then the access will be treated as non-secure even if the relevant NS bit value in the first stage page table (controlled by the virtual machine) identifies the access as secure.

Figure 8:
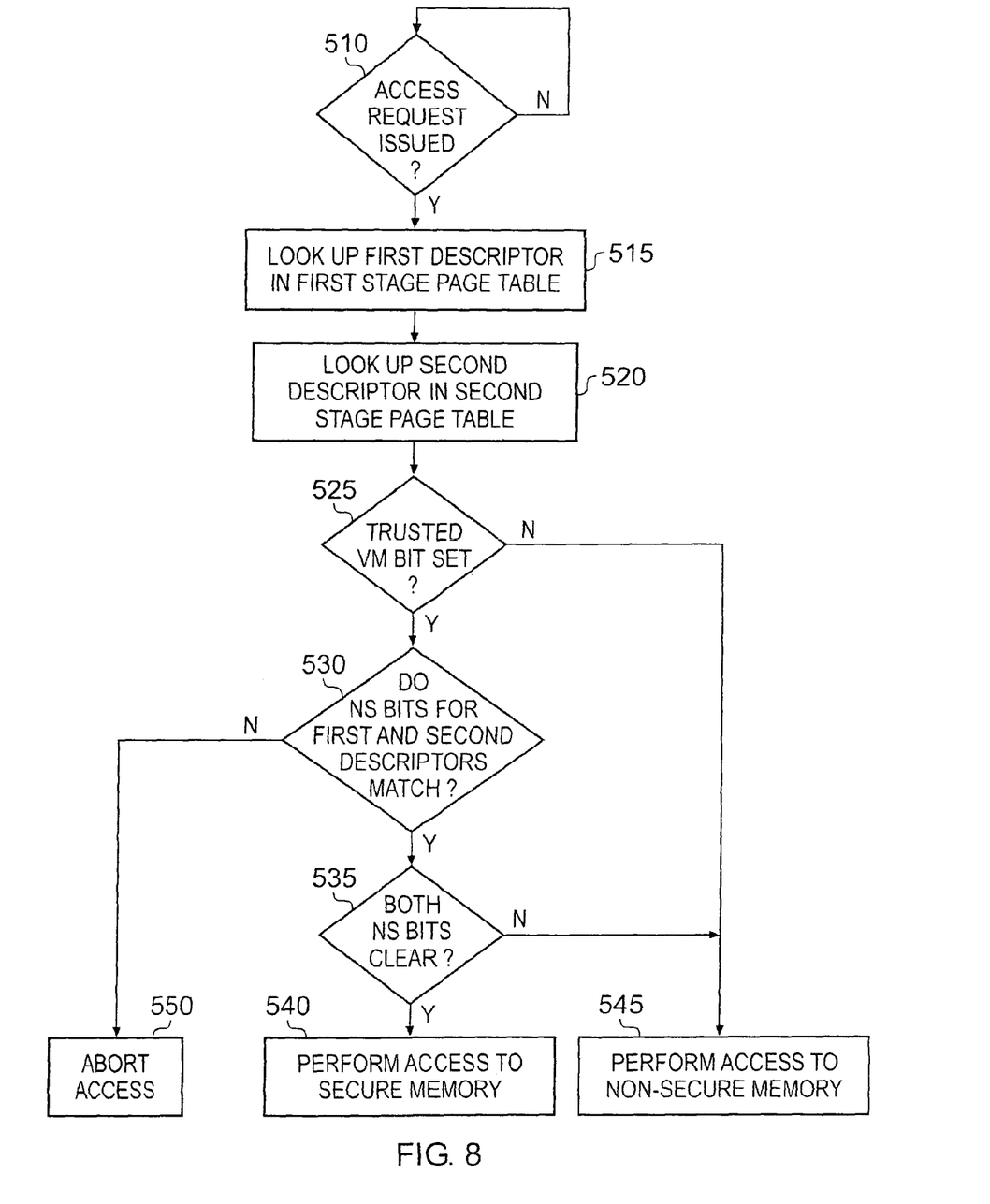
FIG. 8 is a flow diagram illustrating the address translation process in accordance with the second embodiment of the present invention.

FIG. 8 is a flow diagram illustrating the operation of the MMU 230 when employing this alternative embodiment of FIGS. 7A and 7B. At step 510, receipt of an access request is awaited, and upon receipt of the access request a lookup is performed with reference to the first stage page table at step 515 in order to obtain the necessary access information from the first descriptor. Thereafter, a lookup is also performed at step 520 in the second stage page table to obtain the necessary access information from the second descriptor. Although shown sequentially, steps 515 and 520 can be performed in parallel. As with the first embodiment described with reference to FIG. 6, if the necessary information is already cached in the TLB 240, there is no need to perform the access in respect of the first and/or second stage page tables.

As step 525, it is determined whether the trusted VM bit is set. If it is not, then a physical address in the non-secure physical address space will be produced and an access to non-secure memory will be performed at step 545.

However, if the trusted VM bit is set, it is then determined at step 530 whether the NS bits for the first and second descriptors match. If they do not, then in accordance with one embodiment, the access is aborted at step 550. However, assuming the NS bits match, then at step 535 it is determined whether both NS bits are clear (i.e. whether both NS bits identify the access as secure). If both NS bits are clear, then a physical address in the secure physical address space is produced, and an access to secure memory is performed at step 540. Otherwise, the process branches from step 535 to step 545, and an access to non-secure memory is performed using a physical address in the non-secure physical address space produced by the MMU 230.

From the above description of embodiments of the present invention, it will be appreciated that such embodiments allow multiple virtual machines to be executed on a processor, with individual of those virtual machines being allowed to access secure memory under the control of hypervisor software, through the setting of a trusted VM bit managed by the hypervisor software. In systems having a secure domain and a non-secure domain, all of the virtual machines can be executed in the non-secure domain, but through use of the trusted VM bit managed by the hypervisor software executing in the secure domain, certain of those virtual machines can be recognised as trusted virtual machines that are allowed to issue access requests that can be mapped into the secure memory address space, thus allowing controlled access to secure memory by those virtual machines under the control of the hypervisor software.

Accordingly, by using the techniques of embodiments of the present invention, it is possible to provide multiple trusted virtual machines that can be allowed to access memory as though they were operating in the secure domain, even though in fact they are operating in the non-secure domain. Since the trust virtual machines operate in the non-secure domain, they do not have the secure level of privilege that would be associated with applications truly operating in the secure domain, such as the secure applications 102, 104 executed on the secure kernel 100 shown in FIG. 2, but under hypervisor control are allowed to access secure memory in an analogous way to that in which the secure applications 102, 104 could access secure memory.

Through such an approach, it is possible for the hypervisor software to virtualise multiple secure operating systems in a similar way to non-secure operating systems. Thus, in one embodiment, it would be possible to virtualise multiple secure and non-secure operating system pairs such as those shown in FIG. 2.

Although example embodiments have been described herein, it will be appreciated that the claims are not limited thereto and that many modifications and additions thereto may be made within the scope of the claims.

We claim:

1. A data processing apparatus, comprising:
 processing circuitry configured to execute hypervisor software to support the execution of multiple virtual machines on the processing circuitry;
 a memory system configured to store data for access by the processing circuitry, the memory system comprising secure memory for storing secure data and non-secure memory for storing non-secure data, the secure memory only being accessible via a secure access request;
 the processing circuitry being configured to execute in a secure domain when executing the hypervisor software, the secure memory being accessible from the secure domain, and the processing circuitry being configured to execute in a non-secure domain when executing any of the multiple virtual machines, as a default position the secure memory not being accessible from the non-secure domain;
 address translation circuitry, responsive to an access request issued by a current virtual machine executing on the processing circuitry and specifying a virtual address, to perform an address translation process to identify a physical address in said memory system containing data seeking to be accessed by the current virtual machine, and to cause to be issued to the memory system a modified access request specifying the physical address; and
 a storage configured to store a trusted virtual machine identifier managed by the hypervisor software, the hypervisor software being arranged to set the trusted virtual machine identifier if the current virtual machine is to be trusted to access the secure memory;
 in response to the access request issued by the current virtual machine, if the trusted virtual machine identifier is not set, the address translation circuitry is configured to maintain said default position by causing the modified access request to be issued as a non-secure access request specifying a physical address within the non-secure memory, but if the trusted virtual machine identifier is set, the address translation circuitry is configured to overcome the default position by causing the modified access request to be issued as said secure access request able to specify a physical address within the secure memory while the processing circuitry continues to execute in said non-secure domain.

2. The data processing apparatus as claimed in claim 1, wherein the address translation circuitry is arranged to perform the address translation by performing a virtual address to intermediate address translation dependent on a first stage page table, and an intermediate address to physical address translation dependent on a second stage page table, at least the second stage page table being managed by the hypervisor software.

3. The data processing apparatus as claimed in claim 2, wherein the first stage page table is managed by the current virtual machine.

4. The data processing apparatus as claimed in claim 2, further comprising:
 page table identifier storage for identifying the first stage page table and the second stage page table;
 if the trusted virtual machine identifier is set, the page table identifier storage is arranged to identify a non-secure second stage page table and a secure second stage page table;
 when performing the address translation in response to the access request issued by the current virtual machine, the address translation circuitry using the specified virtual address to access a descriptor in the first stage page table providing information required to produce a corresponding intermediate address, the descriptor further providing a first stage security value;
 if the trusted virtual machine identifier is set, the first stage security value being used to determine whether the non-secure second stage page table or the secure second stage page table is used when performing the intermediate address to physical address translation.

5. The data processing apparatus as claimed in claim 4, wherein if the trusted virtual machine identifier is not set, the non-secure second stage page table is used when performing the intermediate address to physical address translation, irrespective of the first stage security value, and the address translation circuitry causes the modified access request to be issued as a non-secure access request specifying a physical address within the non-secure memory.

6. The data processing apparatus as claimed in claim 4, wherein:
  if the secure second stage page table is used when performing the intermediate address to physical address translation, the address translation circuitry uses the produced intermediate address to access a descriptor in the secure second stage page table providing information required to produce a corresponding physical address, the descriptor further providing a second stage security value;
  the second stage security value being used to determine whether the address translation circuitry generates as the corresponding physical address a physical address within the secure memory or a physical address within the non-secure memory;
  whereby the address translation circuitry causes the modified access request to be issued as said secure access request specifying a physical address within the secure memory if the trusted virtual machine identifier is set, the first stage security value causes the secure second stage page table to be used when performing the intermediate address to physical address translation, and the second stage security value causes the address translation circuitry to generate as the corresponding physical address a physical address within the secure memory.

7. The data processing apparatus as claimed in claim 2, wherein:
  when performing the address translation in response to the access request issued by the current virtual machine, the address translation circuitry uses the specified virtual address to access a descriptor in the first stage page table providing information required to produce a corresponding intermediate address, the descriptor further providing a first stage security value, and the address translation circuitry further uses the produced intermediate address to access a descriptor in the second stage page table providing information required to produce a corresponding physical address, the descriptor further providing a second stage security value;
  if the trusted virtual machine identifier is set, the address translation circuitry causes the modified access request to be issued as said secure access request specifying a physical address within the secure memory if both the first stage security value and the second stage security value identify the access as secure.

8. The data processing apparatus as claimed in claim 7, wherein if the trusted virtual machine identifier is set, the address translation circuitry causes the modified access request to be issued as a non-secure access request specifying a physical address within the non-secure memory if both the first stage security value and the second stage security value identify the access as non-secure.

9. The data processing apparatus as claimed in claim 7, wherein if the trusted virtual machine identifier is set, the address translation circuitry causes the access request to be aborted if the first stage security value and the second stage security value differ.

10. The data processing apparatus as claimed in claim 7, wherein if the trusted virtual machine identifier is not set, the address translation circuitry causes the modified access request to be issued as a non-secure access request specifying a physical address within the non-secure memory irrespective of the first stage security value and the second stage security value.

11. The data processing apparatus as claimed in claim 1, wherein if an access request is issued by the processing circuitry when executing in the secure domain, the address translation circuitry is arranged to perform, based on the specified virtual address, a virtual address to physical address translation dependent on a secure page table managed by the hypervisor software.

12. A method of controlling access to secure memory by virtual machines executing on processing circuitry, the processing circuitry executing hypervisor software to support the execution of multiple virtual machines on the processing circuitry, and a memory system being provided for storing data for access by the processing circuitry, the memory system comprising said secure memory for storing secure data and non-secure memory for storing non-secure data, the secure memory only being accessible via a secure access request, the processing circuitry executing in a secure domain when executing the hypervisor software, the secure memory being accessible from the secure domain, and the processing circuitry executing in a non-secure domain when executing any of the multiple virtual machines, where as a default position the secure memory is not accessible from the non-secure domain, the method comprising the steps of:
  storing in a storage accessible to the processing circuitry a trusted virtual machine identifier managed by the hypervisor software, the hypervisor software setting the trusted virtual machine identifier if a current virtual machine is to be trusted to access the secure memory;
  responsive to an access request issued by the current virtual machine executing on the processing circuitry and specifying a virtual address, performing an address translation process to identify a physical address in said memory system containing data seeking to be accessed by the current virtual machine;
  issuing to the memory system a modified access request specifying the physical address;
  if the trusted virtual machine identifier is not set, maintaining said default position during said issuing step by issuing to the memory system the modified access request as a non-secure access request specifying a physical address within the non-secure memory,
  if the trusted virtual machine identifier is set, overcoming the default position during said issuing step by issuing the modified access request as said secure access request able to specify a physical address within the secure memory while the processing circuitry continues to execute in said non-secure domain.

* * * * *